(12) United States Patent
Yang et al.

(10) Patent No.: US 8,361,830 B2
(45) Date of Patent: Jan. 29, 2013

(54) IMAGE SENSOR MODULE AND METHOD OF MANUFACTURING THE SAME

(75) Inventors: Chuan-Hui Yang, Tainan County (TW); Hsin-Chang Hsiung, Tainan County (TW); Yi-Chuan Lo, Tainan County (TW); Han-Yi Kuo, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 230 days.

(21) Appl. No.: 12/757,228

(22) Filed: Apr. 9, 2010

(65) Prior Publication Data
US 2011/0248367 A1   Oct. 13, 2011

(51) Int. Cl.
*H01L 21/00* (2006.01)
(52) U.S. Cl. .......... 438/72; 257/433; 257/E31.127; 257/E23.116; 359/601; 348/335
(58) Field of Classification Search .......... None
See application file for complete search history.

(56) References Cited

U.S. PATENT DOCUMENTS

| 7,227,236 B1* | 6/2007 | Lee et al. | 257/433 |
| 2009/0095893 A1* | 4/2009 | Strum | 250/239 |
| 2009/0122178 A1* | 5/2009 | Kwon et al. | 348/340 |
| 2010/0053318 A1* | 3/2010 | Sasaki | 348/125 |
| 2010/0128350 A1* | 5/2010 | Findlay et al. | 359/601 |
| 2011/0037886 A1* | 2/2011 | Singh et al. | 348/340 |

FOREIGN PATENT DOCUMENTS

| CN | 1682377 | 10/2005 |
| TW | 200601823 | 1/2006 |

OTHER PUBLICATIONS

"Office Action of Taiwan counterpart application" issued on Oct. 22, 2012, p1-p11, in which the listed reference was cited.

\* cited by examiner

*Primary Examiner* — Michelle Mandala
*Assistant Examiner* — Shaka White
(74) *Attorney, Agent, or Firm* — J.C. Patents

(57) ABSTRACT

An image sensor module having a light gathering region and a light non-gathering region includes an image sensor, a light blocking spacer, a lens layer and a fixing shell. The light blocking spacer is disposed on the image sensor and located in the light non-gathering region. The light blocking spacer has a through hole exposing a portion of the image sensor in the light gathering region. The lens layer is disposed on the light blocking spacer and covers the through hole. The lens layer includes a transparent substrate and a lens disposed on the transparent substrate and located in the light gathering region. The fixing shell located in the light non-gathering region wraps the sidewalls of the image sensor, the light blocking spacer and the lens layer continuously. The material of the fixing shell includes a thermosetting material. A method for manufacturing the image sensor module is also provided.

3 Claims, 4 Drawing Sheets

IMAGE SENSOR MODULE AND METHOD OF MANUFACTURING THE SAME

BACKGROUND OF THE INVENTION

1. Field of the Invention

The invention relates to an image sensor module and a method of manufacturing the same. More particularly, the invention relates to an image sensor module having high structure strength and a method of manufacturing the same.

2. Description of Related Art

With the trend of the module miniaturization and low-cost of the electronic product, the appearance of the wafer level module (WLM) technology draws people's attention. The WLM technology miniaturizes the size of the electronic product and reduces the manufacturing cost by mainly the wafer level manufacturing technology. The WLM technology may be applied to the manufacture of the lens module of the image sensor module such that the size of the lens module may be reduced comparing to the traditional lens module and maybe applied to the camera module of the electronic device, such as notebooks, mobile phones, etc.

FIG. 1 shows the cross-section view of the conventional image sensor module using the WLM technology. Referring to FIG. 1, the conventional image sensor module 100 has an image sensor device 110, a spacer 120 and a lens device 130. The spacer 120 has a through hole 122 such that the light emitted to the lens device 130 may be emitted to the image sensor device 110 through the through hole 122.

The bonding area between the image sensor device 110 and the spacer 120, or the spacer 120 and the lens device 130 is smaller conventionally. Therefore, the problem of insufficient bonding strength to each other easily occurs. In addition, during the subsequent process or transportation, when the image sensor module 100 sustains an impact, the image sensor device 110 and the spacer 120 (or the spacer 120 and the lens device 130) are easily displaced or even separated such that the imaging quality of the image sensor module 100 is lowered or the image sensor module 100 is damaged. Moreover, the conventional spacer 120 is usually made of the transparent material, such as glass or plastics. Therefore, the flare passes through the spacer 120 easily during optical imaging such that the noise ratio of optical imaging of the image sensor module 100 becomes significant to lower the imaging quality.

SUMMARY OF THE INVENTION

The invention provides an image sensor module having high structure strength.

The invention provides a method of manufacturing an image sensor module which effectively fixes the device in the image sensor module.

The invention provides an image sensor module. The image sensor module has a light gathering region and a light non-gathering region. The image sensor module includes an image sensor, a first light blocking spacer, a lens layer and a fixing shell. The first light blocking spacer is disposed on the image sensor and located in the light non-gathering region. The first light blocking spacer has a first through hole. The first through hole exposes a portion of the image sensor in the light gathering region. The lens layer is disposed on the first light blocking spacer and covers the first through hole. The lens layer includes a transparent substrate and a first lens. The first lens is disposed on the transparent substrate and located in the light gathering region. The fixing shell wraps the sidewalls of the image sensor, the first light blocking spacer and the lens layer continuously, and the fixing shell is located in the light non-gathering region. The material of the fixing shell comprising a thermosetting material.

According to an embodiment of the invention, the fixing shell conformally covers the sidewalls of the image sensor, the first light blocking spacer and the lens layer.

According to an embodiment of the invention, the fixing shell is a single-layer or a multi-layer structure.

According to an embodiment of the invention, the thermosetting material is an opaque material.

According to an embodiment of the invention, the fixing shell includes an opaque material layer.

According to an embodiment of the invention, the thickness of the fixing shell is about greater than 10 microns.

According to an embodiment of the invention, the transparent substrate has a first surface and a second surface in opposition to each other, and the first surface faces to the image sensor. The lens layer further includes a second lens. The first lens and the second lens are respectively disposed on the first surface and the second surface.

According to an embodiment of the invention, the first lens is a concave lens or a convex lens.

According to an embodiment of the invention, the material of the first light blocking spacer includes an opaque material.

According to an embodiment of the invention, the image sensor module further includes a second light blocking spacer and a transparent cover plate. The second light blocking spacer is disposed on the transparent substrate and located in the light non-gathering region. The second light blocking spacer has a second through hole. The second through hole exposes a portion of the lens layer in the light gathering region. The transparent cover plate is disposed on the second light blocking spacer and covers the second through hole, wherein the fixing shell further wraps the sidewalls of the second light blocking spacer and the transparent cover plate.

According to an embodiment of the invention, the transparent cover has a third surface away from the transparent substrate, and the fixing shell further covers a portion of the third surface in light non-gathering region.

According to an embodiment of the invention, the image sensor module further includes an aperture structure. The aperture structure is disposed on a third surface of the transparent cover away from the transparent substrate, and has an opening. The opening exposes a portion of the lens layer in the light gathering region.

According to an embodiment of the invention, the image sensor module further includes an adhesion layer. The adhesion layer is disposed between the transparent substrate and the first light blocking spacer.

The invention provides a method of manufacturing an image sensor module as follows. The image sensor module has a light gathering region and a light non-gathering region. First, an image sensor, a first light blocking spacer and a lens layer are provided. The first light blocking spacer is disposed on the image sensor and is located in the light non-gathering region. The first light blocking spacer has a first through hole. The first through hole exposes a portion of the image sensor in the light gathering region. The lens layer is disposed on the first light blocking spacer and covers the first through hole. The lens layer includes a transparent substrate and a first lens. The first lens is disposed on the transparent substrate and located in the light gathering region. Then, a fixing shell is formed on the sidewalls of the image sensor, the first light blocking spacer and the lens layer. The fixing shell is located in the light non-gathering region. The material of the fixing shell includes a thermosetting material.

According to an embodiment of the invention, the method of forming the fixing shell includes: coating the thermosetting material on the sidewalls of the image sensor, the first light blocking spacer and the lens layer; heating and curing the thermosetting material.

According to an embodiment of the invention, when coating the thermosetting material, the fixing shell conformally and continuously covers the sidewalls of the image sensor, the first light blocking spacer and the lens layer.

According to an embodiment of the invention, the method of manufacturing the image sensor module further includes: before coating the thermosetting material, forming a protection layer on a surface of the lens layer away from the first light blocking spacer, wherein the protection layer is at least located in the light gathering region; after coating the thermosetting material, removing the protection layer.

According to an embodiment of the invention, the method of manufacturing the image sensor module further includes before forming the fixing shell, providing a second light blocking spacer and a transparent cover plate, wherein the second light blocking spacer is disposed on the transparent substrate and is located in the light non-gathering region. The second light blocking spacer has a second through hole. The second through hole exposes a portion of the lens layer in the light gathering region. The transparent cover plate is disposed on the second light blocking spacer and covers the second through hole. The method of forming fixing shell includes coating the thermosetting material on the sidewalls of the image sensor, the first light blocking spacer, the lens layer, the second light blocking spacer and the transparent cover plate.

According to an embodiment of the invention, the method of forming the fixing shell includes: coating an opaque material on the sidewalls of the image sensor, the first light blocking spacer and the lens layer to form an opaque material layer; and coating the thermosetting material on the sidewalls of the image sensor, the first light blocking spacer and the lens layer to form a thermosetting material layer, wherein the thermosetting material layer overlaps the opaque material layer.

In summary, the fixing shell of the invention effectively fixes all the device (such as the image sensor, the light blocking spacer, the lens layer and the transparent cover plate) wrapped by the fixing shell such that the structure strength of the image sensor module in the invention is enhanced and the imaging quality of the image sensor module is ensured.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
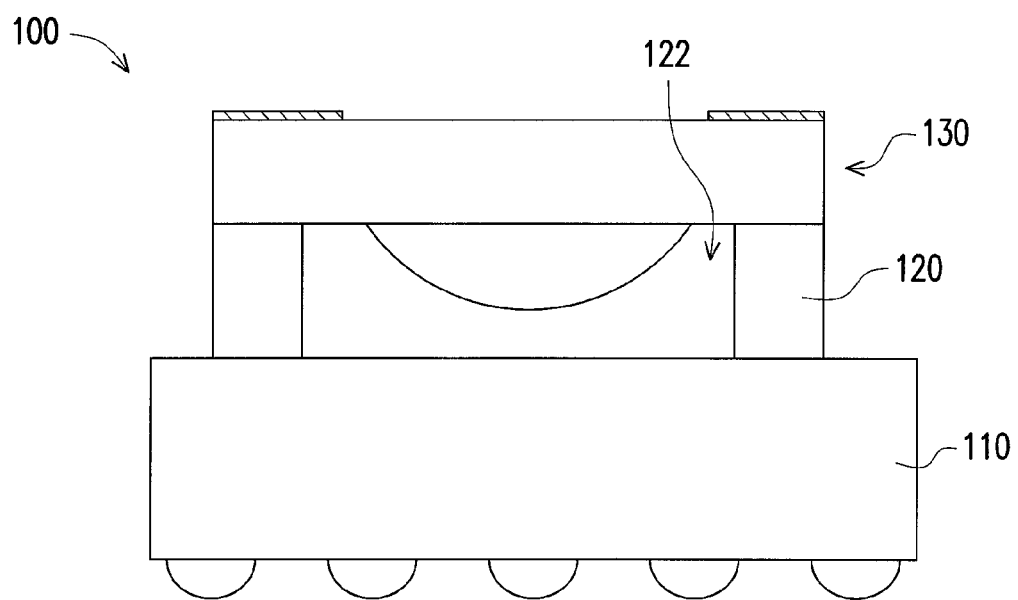
FIG. 1 shows the cross-section view of the conventional image sensor module using the WLM technology.
Figure 2A:
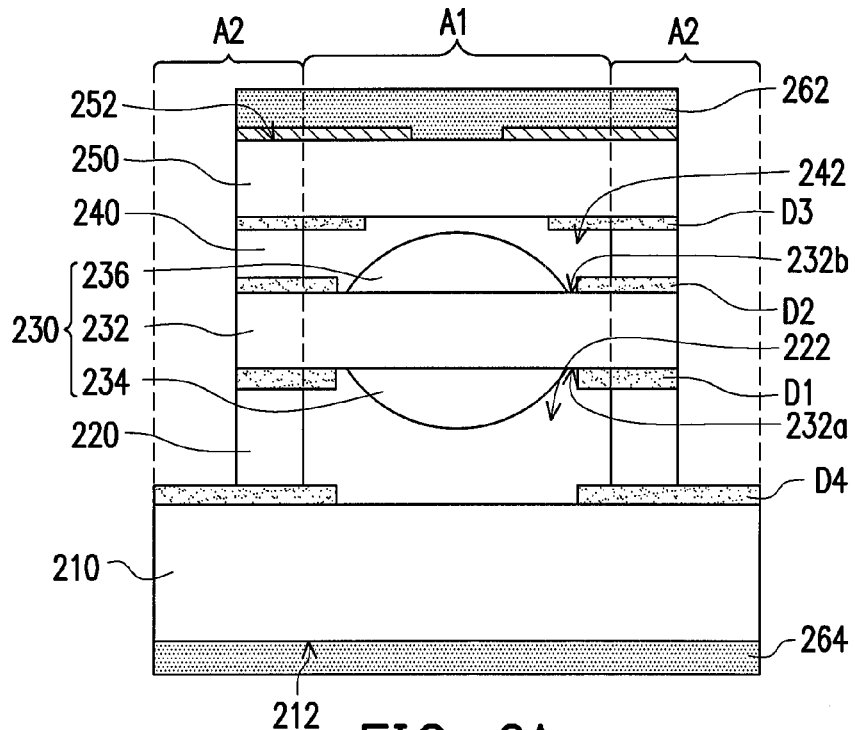
FIG. 2A~2C show the cross-sectional views of the process of the image sensor module according to an embodiment of the invention.
Figure 2B:
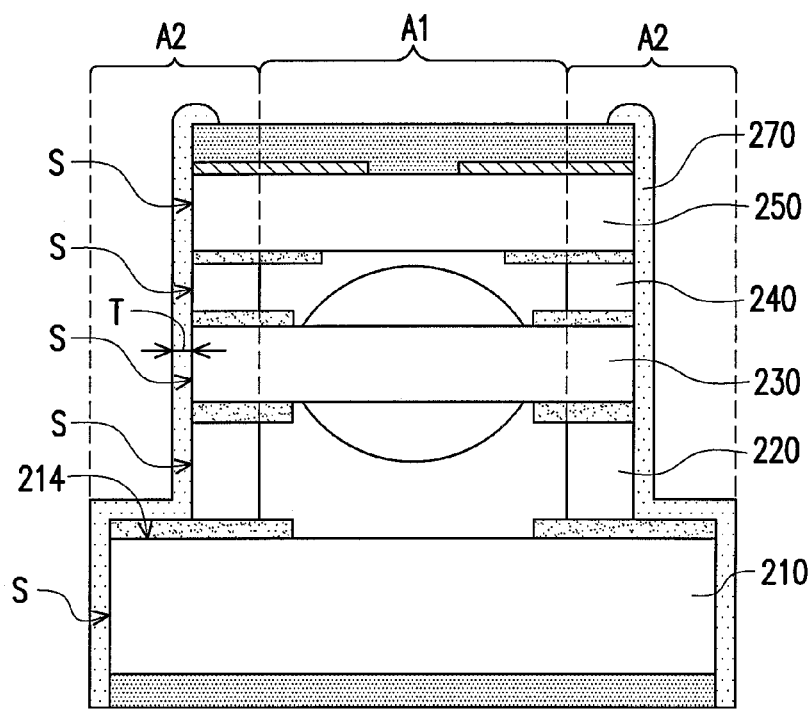
Figure 2C:
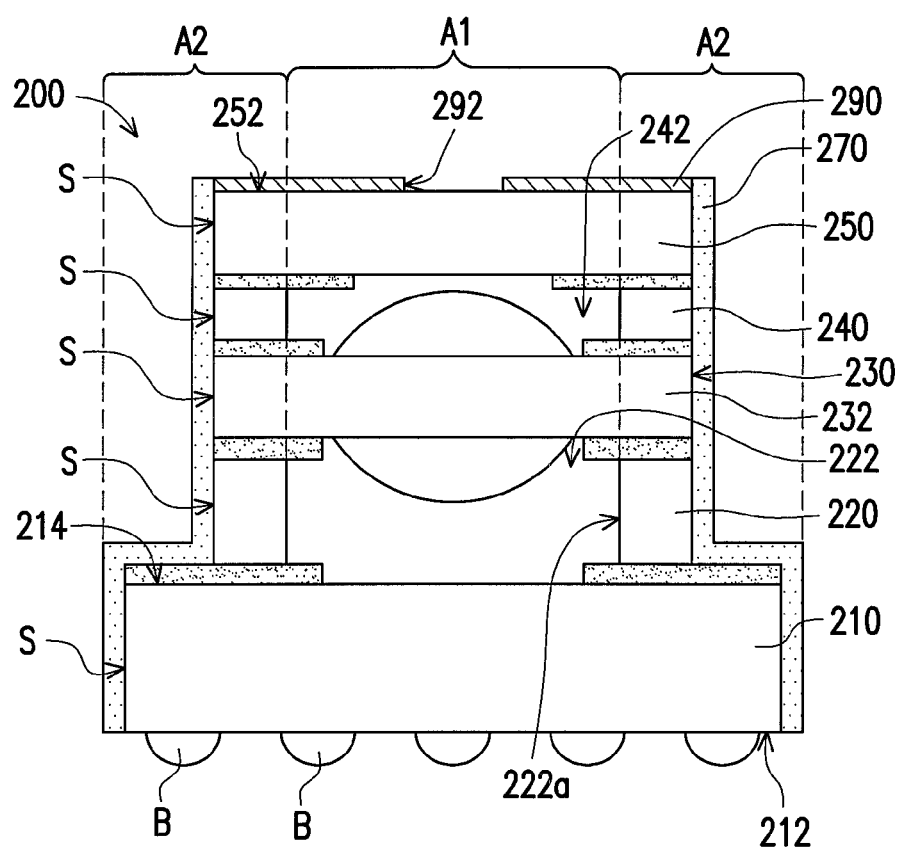
Figure 3:
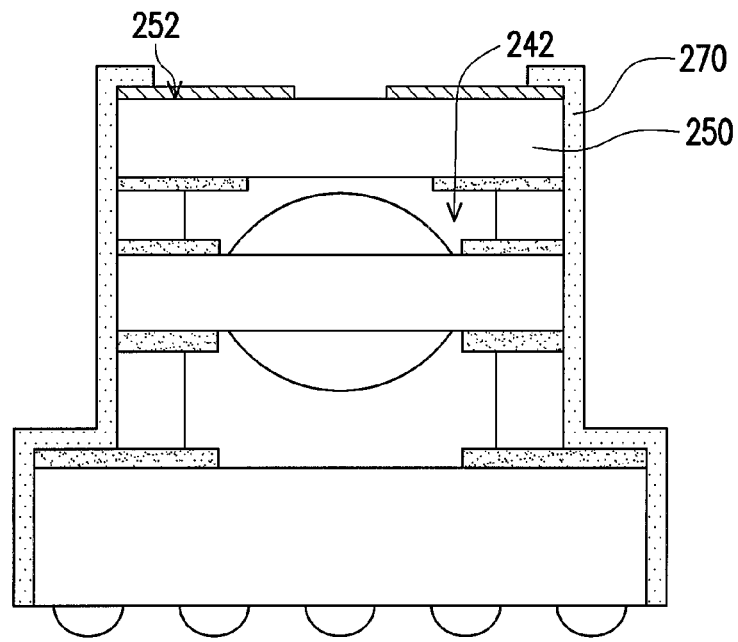
FIG. 3 shows the cross-sectional view of the image sensor module according to an embodiment of the invention.
Figure 4:
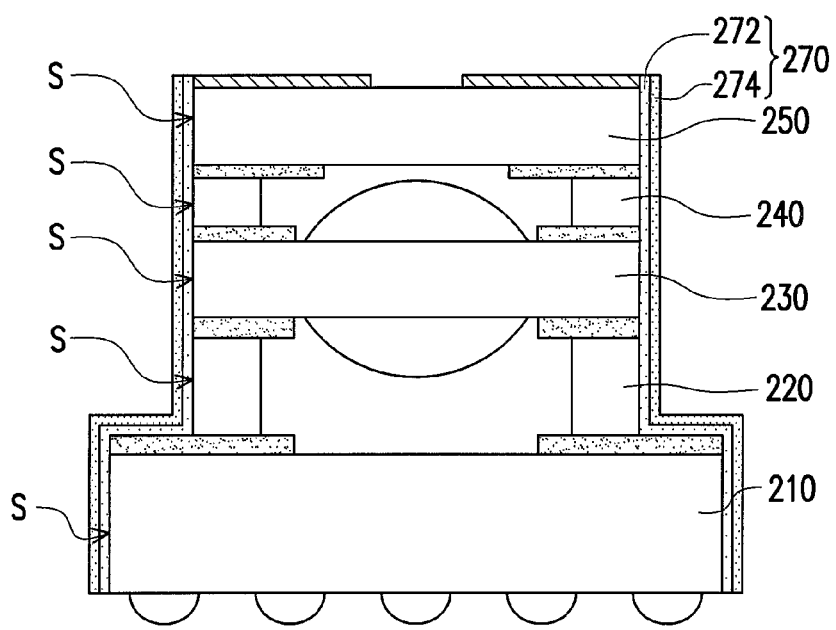
FIG. 4 shows the cross-sectional view of the image sensor module according to another embodiment of the invention.

FIG. 2A~2C shows the cross-sectional view of the process of the image sensor module according to an embodiment of the invention. FIG. 3 shows the cross-sectional view of the image sensor module according to an embodiment of the invention. FIG. 4 shows the cross-sectional of the image sensor module according to another embodiment of the invention.

First, referring to FIG. 2A, an image sensor 210, a first light blocking spacer 220 and a lens layer 230 are provided wherein the image sensor 210 is, for example, a complementary metal oxide semiconductor (CMOS) sensor. The first light blocking spacer 220 is disposed on the image sensor 210. The material of the first light blocking spacer includes an opaque material. The first light blocking spacer 220 has a first through hole 222. The first through hole 222 may be used to define a light gathering region A1. The first light blocking spacer 220 is disposed on a light non-gathering region A2 surrounding the light gathering region A1. The first through hole 222 exposes a portion of the image sensor 210 in the light gathering region A1.

The lens layer 230 is disposed on the first light blocking spacer 220 and covers the first through hole 222. In the present embodiment, the lens layer 230 includes a transparent substrate 232, a first lens 234 and a second lens 236. The transparent substrate 232 has a first surface 232a and a second surface 232b in opposition to each other, and the first surface 232a faces to the image sensor 210. the first lens 234 and the second lens 236 are respectively disposed on the first surface 232a and the second surface 232b and are located in the light gathering region A1.

In other embodiment not shown, making the number of the lens layer 230 as single or multiple depends on the practical requirement. The lens layer 230 may have the first lens 234 or the second lens 236, and may have the first lens 234 and the second lens 236 both. The number of the first lens 234 or the second lens 236 of the lens layer 230 may be single or multiple.

In the present embodiment, the first lens 234 and the second lens 236 are convex lenses. In other embodiments, at least one of the first lens 234 and the second lens 236 is concave lens.

In the present embodiment, in order to prevent the second lens 236 from sustaining an impact or a scratch, a second light blocking spacer 240 and a transparent cover plate 250 are selectively provided. The second light blocking spacer 240 is disposed on the transparent substrate 232 and located in the light non-gathering region A2. The second light blocking spacer 240 has a second through hole 242. The second through hole 242 exposes a portion of the lens layer 230 in the light gathering region A1. The transparent cover plate 250 is disposed on the second light blocking spacer 240 and covers the second through hole 242.

In addition, in the present embodiment, in order to firmly bond the transparent substrate 232 and the first light blocking spacer 220, an adhesion layer D1 maybe disposed between the transparent substrate 232 and the first light blocking spacer 220. Similarly, an adhesion layer D2 maybe disposed between the transparent substrate 232 and the second light blocking spacer 240. An adhesion layer D3 maybe disposed between the second light blocking spacer 240 and the transparent cover plate 250. An adhesion layer D4 maybe disposed between the first light blocking spacer 220 and the image sensor 210. The adhesion layers D1~D4 may be the double-side adhesive tape, ultraviolet curing adhesive or other glues having high adhesiveness.

Next, in the present embodiment, two protection layers 262, 264 may be respectively formed on a surface 252 of the transparent cover plate 250 away from the second light blocking spacer 240 and a surface 212 of the image sensor 210 away from the first light blocking spacer 220.

Then, referring to FIG. 2B, a fixing shell 270 is formed on the sidewalls S of the image sensor 210, the first light blocking spacer 220, the lens layer 230, the second light blocking spacer 240 and the transparent cover plate 250. The fixing shell 270 is located in the light non-gathering region A2. The material of the fixing shell 270 includes a thermosetting material. In the present embodiment, the thickness T of the fixing shell 270 is about greater than 10 microns, for example, 40~50 microns. The material of the fixing shell 270 may be, for example, the heat-resistance (above 250° C.) material.

Then, referring to FIG. 2C, the protection layers 262, 264 are removed to remove a portion of the fixing shell 270 located on the protection layers 262, 264. At this time, the image sensor module 200 of the embodiment is initially formed. In addition, the conductive bumps B may be selectively formed on the surface 212 of the image sensor 210 such that the image sensor 210 may be electrically connected to other electronic devices (such as the circuit board) by the conductive bumps B.

In detail, the method of forming fixing shell 270 may be coating the thermosetting material on the sidewalls S of the image sensor 210, the first light blocking spacer 220, the lens layer 230, the second light blocking spacer 240 and the transparent cover plate 250, then, heating and curing the thermosetting material.

When the thermosetting material is coated, the thermosetting material conformally and continuously covers the sidewalls S of the image sensor 210, the first light blocking spacer 220, the lens layer 230, the second light blocking spacer 240, the transparent cover plate 250 and a surface 214 of the image sensor 210 facing to the first light blocking spacer 220.

After the thermosetting material is heated and cured, the cured thermosetting material effectively fixes all the devices (the image sensor 210, the first light blocking spacer 220, the lens layer 230, the second light blocking spacer 240 and the transparent cover plate 250) wrapped by the cured thermosetting material to prevent the devices from the displacement such that the structure strength of the image sensor module 200 in the present embodiment is enhanced and the imaging quality of the image sensor module 200 is ensured. In detail, the fixing shell 270 may resist the lateral force or vertical force applied to the image sensor module 200 such that it is ensured that devices wrapped by the fixing shell 270 are firmly bonded.

Moreover, the fixing shell 270 in the present embodiment is directly formed on the sidewalls S of the image sensor 210, the first light blocking spacer 220, the lens layer 230, the second light blocking spacer 240, the transparent cover plate 250. Therefore, no matter what shapes the devices (the image sensor 210, the first light blocking spacer 220, the lens layer 230, the second light blocking spacer 240, the transparent cover plate 250) are in, the fixing shell 270 effectively wraps all the devices.

In addition, in the present embodiment, the fixing shell 270 may be an opaque material layer. Therefore, the fixing shell 270 may effectively block the light from the outside to avoid the flare such that the imaging quality of the image sensor module 200 is enhanced. In the present embodiment, the thermosetting material may be an opaque material.

Furthermore, the material of the fixing shell 270 may be heat-resistant (above 250° C.) such that the image sensor module 200 in the present embodiment may pass through the tin furnace to electrically connect to other electronic devices (such as the circuit board).

In addition, in order to prevent the flare from entering the second through hole 242, a aperture structure 290 is disposed on the surface 252 of the transparent cover plate 250. The aperture structure 290 has an opening 292. The opening 292 exposes a portion of the lens layer 230 in the light gathering region A1.

In another embodiment, the protection layer (not shown) may expose a partial surface 252 of the transparent cover plate 250. Therefore, after the protection layer is removed, the fixing shell 270 may cover the partial surface 252 (as shown in FIG. 3). Thus, the fixing shell 270 blocks the flare from entering the second through hole 242 by partially blocking the transparent cover plate 250. And the fixing shell 270 fixes the transparent cover plate 250 further firmly by the portion of the fixing shell 270 covering the surface 252.

In another embodiment, the method of forming fixing shell 270 may be first coating an opaque material on the sidewalls S of the image sensor 210, the first light blocking spacer 220, the lens layer 230, the second light blocking spacer 240 and the transparent cover plate 250 to form an opaque material layer 272 (as shown in FIG. 4). Then, the thermosetting material is coated on the opaque material layer 272 to form a thermosetting material layer 274. Next, the thermosetting material 274 is heated and cured. In other word, the fixing shell 270 in the present embodiment is the multi-layer structure. In other embodiments, the thermosetting material layer 274 may be formed first, and then the opaque material layer 272 is formed.

The invention is not limited to the fixing shell 270 only having the opaque material layer 272 and the thermosetting material layer 274. For example, the fixing shell 270 may have multiple material layers with different colors, multiple material layers with different material and multiple material layers with different strength according to the practical requirement.

In summary, the fixing shell of the invention effectively fixes all the device (such as the image sensor, the light blocking spacer, the lens layer and the transparent cover plate) wrapped by the fixing shell such that the structure strength of the image sensor module in the invention is enhanced and the imaging quality of the image sensor module is ensured. Moreover, the fixing shell of the invention is directly formed on the sidewalls of the image sensor, the light blocking spacer, the lens layer, the transparent cover plate. Therefore, no matter what shapes the said devices are in, the fixing shell effectively wraps the said devices. In addition, the fixing shell of the invention may block the light. Therefore, the fixing shell may prevent the flare from entering the image sensor module such that the imaging quality of the image sensor module is enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of manufacturing an image sensor module, the image sensor module having a light gathering region and a light non-gathering region, the method comprising:

providing an image sensor, a first light blocking spacer and a lens layer, wherein the first light blocking spacer is disposed on the image sensor and is located in the light non-gathering region, the first light blocking spacer has a first through hole, the first through hole exposes a portion of the image sensor in the light gathering region, the lens layer is disposed on the first light blocking spacer and covers the first through hole, the lens layer comprises a transparent substrate and a first lens, the first lens is disposed on the transparent substrate and located in the light gathering region; and forming a fixing shell on sidewalls of the image sensor, the first light blocking spacer and the lens layer, the fixing shell located in the light non-gathering region, a material of the fixing shell comprising a thermosetting material, wherein the method of forming the fixing shell comprises:

coating an opaque material on the sidewalls of the image sensor, the first light blocking spacer and the lens layer to form an opaque material layer; and coating the thermosetting material on the sidewalls of the image sensor, the first light blocking spacer and the lens layer to form a thermosetting material layer, and the thermosetting material layer overlapping with the opaque material layer.

2. The method of claim 1, wherein when coating the thermosetting material, the thermosetting material conformally and continuously covers the sidewalls of the image sensor, the first light blocking spacer and the lens layer.

3. The method of claim 1, further comprising:
before coating the thermosetting material, forming a protection layer on a surface of the lens layer away from the first light blocking spacer, wherein the protection layer is at least located in the light gathering region; and after coating the thermosetting material, removing the protection layer.

* * * * *